(12) United States Patent
Kim

(10) Patent No.: US 9,632,396 B2
(45) Date of Patent: Apr. 25, 2017

(54) CAMERA LENS STORAGE AND EXCHANGE DEVICE

(71) Applicant: GoWing CO., LTD., Incheon (KR)

(72) Inventor: Hyun Jun Kim, Uiwang-si (KR)

(73) Assignee: GoWing Co., Ltd., Incheon (KR)

( * ) Notice: Subject to any disclaimer, the term of this patent is extended or adjusted under 35 U.S.C. 154(b) by 161 days.

(21) Appl. No.: 14/442,048

(22) PCT Filed: Mar. 13, 2014

(86) PCT No.: PCT/KR2014/002113
§ 371 (c)(1),
(2) Date: May 11, 2015

(87) PCT Pub. No.: WO2014/157859
PCT Pub. Date: Oct. 2, 2014

(65) Prior Publication Data
US 2015/0301434 A1 Oct. 22, 2015

(30) Foreign Application Priority Data
Mar. 25, 2013 (KR) .................. 10-2013-0031286

(51) Int. Cl.
G03B 17/56 (2006.01)
A45C 11/38 (2006.01)
G03B 11/04 (2006.01)

(52) U.S. Cl.
CPC ............ *G03B 17/566* (2013.01); *A45C 11/38* (2013.01); *G03B 11/041* (2013.01)

(58) Field of Classification Search
CPC ........ A45C 11/38; B65D 85/30; B65D 85/38; B65D 25/287; G03B 11/041; G03B 17/56; G03B 17/566
(Continued)

(56) References Cited

U.S. PATENT DOCUMENTS 4,172,485 A * 10/1979 Mathieu ................ A45C 11/38
206/316.2
4,383,565 A * 5/1983 Denmat ................ B65D 85/38
206/316.1
(Continued)

FOREIGN PATENT DOCUMENTS

JP 11-352580 A 12/1999
JP 2002-099042 A 4/2002
(Continued)

*Primary Examiner* — Bryon Gehman
(74) *Attorney, Agent, or Firm* — DJL Intellectual Property Law PLLC

(57) ABSTRACT

A camera lens storage and exchange device according to the present invention includes a body having a first end and an oppositely disposed second end, where both ends are disposed along a longitudinal axis of the body. The device further includes a coupling mount disposed at each of the first and second ends, where each of the coupling mounts may be configured to, with respect to the body, receive thereto, retain therein, and release therefrom, a camera lens. The device further includes a rotational member connected at a mid-point of the body, where the rotational member may be configured to freely rotate the body about a rotational axis of the rotational member. The longitudinal axis of the body may be disposed orthogonal to and intersecting with the rotational axis of the rotational member.

20 Claims, 2 Drawing Sheets

(58) Field of Classification Search
USPC .......................... 206/316.1, 316.2; 359/896
See application file for complete search history.

(56) References Cited

U.S. PATENT DOCUMENTS 8,281,923 B2 * 10/2012 Elenes ................ B65D 25/287
206/316.2
8,540,104 B2 * 9/2013 Elenes ................ B65D 25/287
220/378

FOREIGN PATENT DOCUMENTS

JP 3180650 U 12/2012
KR 10-2011-0048637 A 5/2011

* cited by examiner

CAMERA LENS STORAGE AND EXCHANGE DEVICE

TECHNICAL FIELD

The present invention relates to a camera lens storage and exchange device, and, more particularly, to a camera lens storage and exchange device being able to quickly and conveniently store a camera lens and exchange camera lenses during outdoor activities.

BACKGROUND ART

Digital cameras are classified into several kinds of product families, each having similar properties such as a performance, a composition, a price, a size, and so on. Recently, the digital cameras are generally classified into a compact camera, a high-end camera, a DSLR (digital single lens reflex) camera, a mirrorless camera, or a hybrid camera.

A compact camera and a high-end camera were very popular around year of 2000. However, the compact camera and the high-end camera were gradually neglected since around year of 2005 when a DSLR camera having an excellent performance more than those of the compact camera and the high-end camera spreaded.

In a SLR camera, an optical device such as a mirror, a pentaprism (a prism having a pentagonal shape), or so on is disposed between a lens and a film. An image penetrating through a lens is projected on a focus screen, and, at the same time, the image introducing into the lens is directly reflected and is positioned or formed on a view finder. A picture, which is completely the same as an image that a photographer watches, can be obtained.

By the above structure, the SLR camera is large and has a sufficient inner space. Thus, various additional functions can be added to the SLR camera and various lenses can be easily mounted on the SLR camera. Generally, a user can exchange lenses of the SLR camera and mount a lens on the SLR camera by oneself. Since properties of a photograph vary according to a kind of lenses mounted on the camera, an expert or a specialist necessary to various photograph performances generally uses the SLR camera.

A mirrorless camera or a hybrid camera is called as a mirrorless camera since the camera does not include a reflector (a mirror), unlike a DSLR camera, or is called as a hybrid camera because the camera has properties of a compact camera and properties of a DSLR camera. Although an exchange of lenses and an installation of the lens are possible, a size of a main body is as small as the compact camera.

As in the above, in the DSLR camera, the mirrorless camera or the hybrid camera that are generally used at present, a user can exchange lenses and can mount a lens on the camera by oneself. Thus, the user using the camera generally carries two or more lenses. Accordingly, storage devices for storing carried lenses have developed a lot. Among the storage devices, a camera lens pouch is most widely used.

When the camera lens pouch is used, a lens that will be exchanged is picked from the camera lens pouch, and a lens that is mounted on the camera is separated from the camera and is put into the camera lens pouch, and then, the lens that will be exchanged is mounted on the camera in order to exchange the lenses. In consideration of a size and a shape of a camera lens, it is difficult for a user to exchange lenses easily and quickly. That is, a risk that a lens falls during the exchange of the lenses is high. A lens may be stored at a predetermined or different location so as to decrease the risk; however, in this case, there is a risk of loss of the lens, or a risk of damage or destruction of the lens due to an external impact or force.

DISCLOSURE

Technical Problem

The invention has been made in an effort to solve the above problems, and an object of the invention is to provide a camera lens storage and exchange device being able to quickly and conveniently store a camera lens and exchange camera lenses without the need to store the camera lens at a predetermined or different location.

Technical Solution

A camera lens storage and exchange device according to the present invention includes a body, a pair of coupling mounts provided at both ends of the body, each of the pair of coupling mounts to be configured to be coupled to a lens mount of a camera lens, and a pair of rotation members provided at an outer surface of the body.

The pair of the rotation members may further include a string having both ends connected to the pair of the rotation members, respectively.

Each of the pair of the coupling mounts may include a plurality of fixing members at an inner circumference surface of each of the pair of the coupling mounts to prevent the lens mount from being separated from each of the pair of the coupling mounts in a state that the lens mount is coupled to one of the coupling mounts.

The body further may include a button to easily separate an end portion of the lens mount from the fixing member.

The rotation member may include a hinge, an inner hanging portion provided at an inside of the body in a state that a center of the inner hanging portion is in contact with a center of one end of the hinge, an outer hanging portion provided at an outside of the body in a state that a center of the outer hanging portion is in contact with a center of the other end of the hinge, and a connecting portion provided at a surface of the outer hanging portion opposite to the hinge, wherein a string is connected to the connecting portion.

The body may have a hole which the hinge penetrates through.

The body may be rotated 360 degrees about an axis of the hinge by the rotation member.

Advantageous Effects

In a camera lens storage and exchange device according to the invention, coupling mounts being able coupled to lens mounts are provided at both ends of an exchange device, and thus, a lens that will be exchanged can be separated from the camera lens storage and exchange device and a lens that is mounted on a camera can be coupled to the camera lens storage and exchange device at the same time. Thus, camera lenses can be easily and quickly exchanged.

DETAILED DESCRIPTION OF THE EMBODIMENTS

Hereinafter, a camera lens storage and exchange device according to an embodiment of the invention will be described in detail with reference to accompanying drawings.

Figure 1:
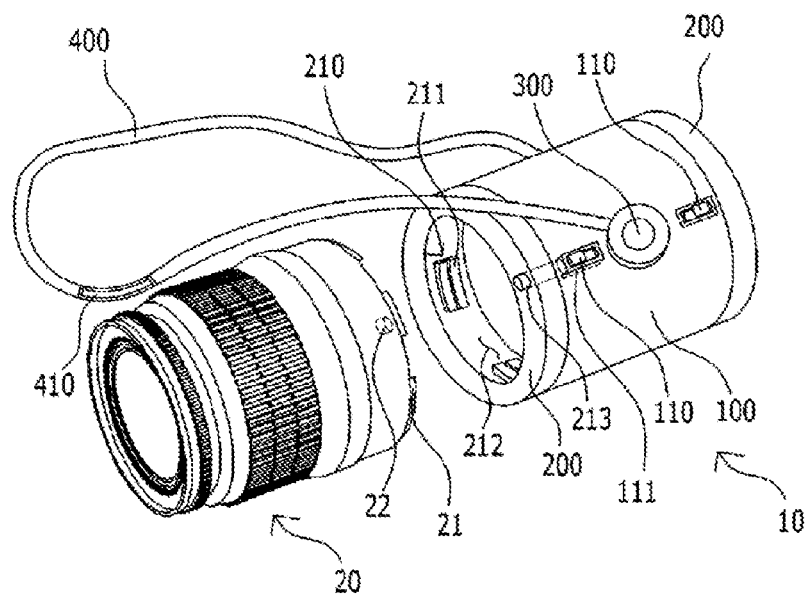
FIG. 1 is a perspective view of a camera lens storage and exchange device according to an embodiment of the invention.

FIG. 1 is a perspective view of a camera lens storage and exchange device according to an embodiment of the invention.

As shown in FIG. 1, a camera lens storage and exchange device 10 according to an embodiment of the invention includes a body 100, a pair of coupling mounts 200 provided at both ends of the body 100, a pair of rotation members (rotation holders) 300 provided at an outer surface of the body 100. Each of the coupling mounts 200 is coupled to a lens mount 21 of a camera lens 20. Also, the pair of the rotation members 300 may include a string 400 having both ends connected to the pair of the rotation members 300, respectively.

The body 100 may be manufactured to be integral with the coupling mounts 200 so that the body 100 and the coupling mounts 200 constitute a single body. Selectively, the body 100 may be manufactured by a separated process from the coupling mounts 200, and then, the body 100 and the coupling mounts 200 are coupled by various coupling methods, such as using screws, welding, or so on.

Each of the coupling mounts 200 includes a plurality of fixing members 210 at an inner circumference surface of each of the coupling mounts 200. The fixing members 210 prevent the lens mount 21 from being separated from the coupling mounts 200 after the lens mount 21 is coupled to the coupling mount 200. Each of the fixing members 210 may include two fixing protrusions 211 as a pair. The two fixing protrusions 211 are formed of thin plate shapes having the same sizes, and the two fixing protrusions 211 are spaced from each other at a predetermined distance. Insertion grooves 212 are formed at portions between the plurality of the fixing members 210, respectively. End portions, (not shown), of the lens mount 21 are inserted into the insertion grooves 212 at an inside of the coupling mount 200. After the end portions of the lens mount 21 are inserted into the insertion grooves 12, the camera lens 20 is rotated at a predetermined angle. Then, the end portions of the lens mount 21 are inserted between the two fixing protrusions 211, respectively. Thereby, the lens mount 21 can be mounted on or fixed to the coupling mount 200. A distance between the two fixing protrusions 211 is the same as a thickness of the end portions of the lens mount 21. Then, after the camera lens 20 is rotated at the predetermined angle and the end portion of the lens mount 21 is inserted between the two fixing protrusions 211, the end portion of the lens mount 21 and the fixing protrusions 211 can be stiffly and tightly fixed to each other. Since the end portion of the lens mount 21 and the two fixing protrusions 211 can be stiffly and tightly fixed to each other, the camera lens 20 can be prevented from being separated from the camera lens storage and exchange device 10 by user's carelessness, or an outer impact or force, after the camera lens 20 is mounted on the camera lens storage and exchange device 10.

However, in a case where the distance between the two fixing protrusions 211 is the same as the thickness of the end portion of the lens mount 21 to prevent the camera lens 20 from being separated from the camera lens storage and exchange device 10 by user's carelessness, or an outer impact or force after the camera lens 20 is mounted on the camera lens storage and exchange device 10, it may be difficult to separate the camera lens 20 from the camera lens storage and exchange device 10. Also, the lens mount 21 or the coupling mount 200 may be damaged by a compulsory separation.

Therefore, the body 100 of the camera lens storage and exchange device 10 may include a button 110 in order to easily separate the end portion of the lens mount 21 from the fixing member 210. The button 110 allows one of the two fixing protrusions 211 positioned at an inner position of the coupling mount 200 between two fixing protrusions 211 constituting the fixing member 210 to move inwardly toward a center of the body 100.

The end portion of the lens mount 21 can be easily separated from the fixing member 210 by the button 110. For example, in order to separate the camera lens 20 from the camera lens storage and exchange device 10 in a state where the camera lens 20 is mounted on the camera lens storage and exchange device 10, the camera lens 20 is rotated in a predetermined direction in a state where the button 110 is pushed, and then, the camera lens 20 can easily rotate, compared with a case where the camera lens 20 rotates in the predetermined direction in a state where the button 110 is not pushed. Accordingly, the camera lens 20 can be easily separated from the camera lens storage and exchange device 10 when the button 110 is pushed. That is, when the button 110 is pushed, the distance between the two fixing protrusions 211 increases, and thus, the end portion of the lens mount 21 can easily escape between the two fixing protrusions 211, and the camera lens 20 can be easily separated from the camera lens storage and exchange device 10.

On the other hand, in order to mount the camera lens 20 on the camera lens storage and exchange device 10 in a state where the camera lens 20 is separated from the camera lens storage and exchange device 10, the end portion of the lens mount 21 is inserted into the insertion groove 212 and the camera lens 20 is rotated in a predetermined direction in a state that the button 110 is pushed, and then, the camera lens 20 can easily rotate, compared with a case where the camera lens 20 is rotated in a predetermined direction in a state that the button 110 is not pushed. Accordingly, the camera lens 20 can be easily mounted on the camera lens storage and exchange device 10 when the but ton 110 is pushed.

An elastic member 111 is provided at an end portion of the button 110 so that the distance between two fixing protrusions 211 can be elastically controlled. Therefore, when the button 110 is not pushed after the camera lens 20 is mounted on the camera lens storage and exchange device 10, the button 110 is located at an original position by the elastic member 111, and the fixing protrusion 211 connected to the button 110 and provided at the inner position of the coupling mount 200 is also located at an original position. Accordingly, after the mount of the camera lens 20, the end portion of the lens mount 21 and the two fixing protrusion 211 can be stiffly and tightly fixed to each other.

Meanwhile, the string 400 provided at the camera lens storage and exchange device 10 may be formed of a string being bounded to the user or put on one shoulder of the user. Further, a control portion 410 for control a length of the string 400 according to a user may be included.

Next, a rotation member 300 provided at the body and connect the string 400 to the body 100 will be described.

Figure 2:
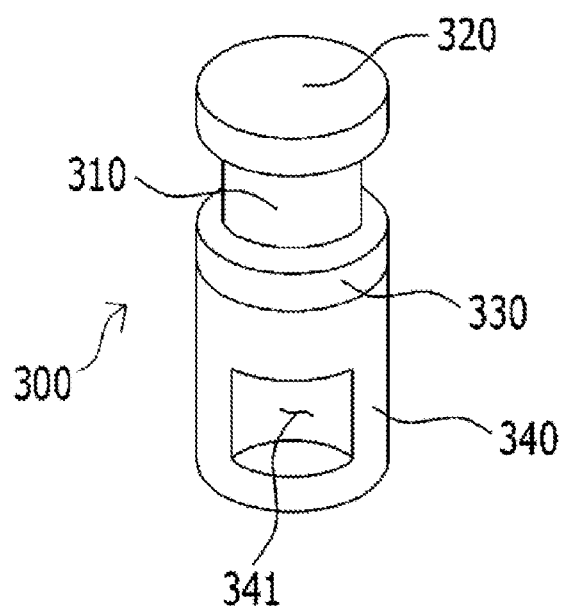
FIG. 2 is a perspective view of a rotation member according to an embodiment of the invention.
Figure 3:
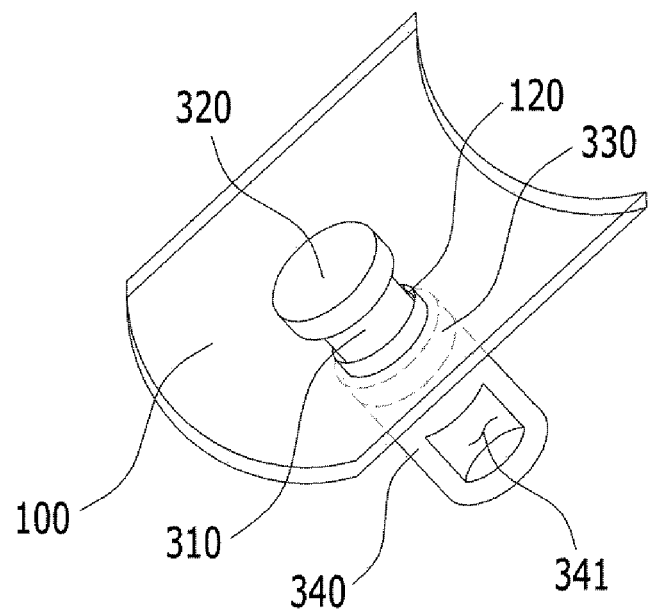
FIG. 3 is a perspective view of the rotation member according to the embodiment of the invention coupled to the body.

FIG. 2 is a perspective view of a rotation member according to an embodiment of the invention, and FIG. 3 is a perspective view of the rotation member according to the embodiment of the invention coupled to the body.

As shown in FIG. 2 and FIG. 3, the rotation member 300 according the embodiment of the invention may include a hinge 310, an inner hanging portion (an inner hooked portion) 320, an outer hanging portion (an outer hooked portion) 330, and a connecting portion 340. The inner hanging portion 320 is provided at an inside of the body 100 in a state where a center of the inner hanging portion 320 is in contact with a center of one end of the hinge 310. The outer hanging portion 330 provided at an outside of the body 100 in a state where a center of the outer hanging portion 33 0 is in contact with a center of the other end of the hinge 310. The connecting portion 340 is provided at a surface of the outer hanging portion 330 opposite to the hinge 310, and the string 400 may be connected to the connecting portion 340. The body 100 has a hole 120 which the hinge 310 penetrates through.

The hinge 310 of the rotation member 300 has a cylindrical shape, and the hinge 310 of the rotation member 300 is smaller than a hole 120 of the body 100. Thus, the hinge 310 of the rotation member 300 can freely rotate within the hole 120. Also, the inner hanging portion 320 is provided at one surface or one side of the hinge 310 to be disposed at an inside of the body 100. The inner hanging portion 320 has a cylindrical shape, like the hinge 310, and the inner hanging portion 320 is larger than the hole 120 of the body 100. Thus, the rotation member 300 can be prevented from being separated from the body 100.

Also, the outer hanging portion 330 is provided at the other surface or the other side of the hinge 310 to be disposed at an outside of the body 100. The outer hanging portion 330 has a cylindrical shape, like the inner hanging portion 320, and the outer hanging portion 330 is larger than the hole 120 of the body 100. Thus, the rotation member 300 can be prevented from falling into the body 100.

A length of the hinge 310 may be greater than a thickness of the body 100 by a predetermined length. If the length of the hinge 310 is the same as the thickness of the body 10 0, the inner hanging portion 320 and the outer hanging portion 330 are in contact with the body 10 0 and thus the hinge 310 may not easily rotate by friction force when the rotation member 300 rotates about an axis of the body 100. On the contrary, if the length of the hinge 310 is excessively greater than the thickness of the body 10 0, a width of the hinge 310 moving the inside and the outside of the body 100 may be large. Then, force applied to the inner hanging portion 320 and the outer hanging portion 330 provided at both sides of the hinge 310 may increase according to the width of the hinge 310 moving the inside and the outside of the body 100, and therefore, the inner hanging portion 320 and the outer hanging portion 330 may be damaged or destroyed or may be separated from the hinge 310. Accordingly, the length of the hinge 310 may be greater than the thickness of the body 100 by the predetermined length so that the excessive force is not applied to the inner hanging portion 320 and the outer hanging portion 330.

In addition, the outer hanging portion 330 may include the connecting portion 340 provided at a surface of the outer hanging portion 330 opposite to the other surface of the hanging portion 330 being in contact with the hinge 310. The string 400 is connected to the connecting portion 340. The connecting portion 340 may be manufactured to be integral with the outer hanging portion 330 so that the connecting portion 340 and the outer hanging portion 330 constitutes a single body. Selectively, the connecting portion 340 may be manufactured by a separated process from the outer hanging portion 330, and then, the connecting portion 340 and the outer hanging portion 330 are coupled by various coupling methods, such as using screws, welding, or so on. Further, as shown in FIG. 3, the connecting portion 340 has a cylindrical shape having the same size as the outer hanging portion 330. However, the invention is not limited thereto, and thus, the connecting portion 340 may have one of various shapes, such as, a square pillar, a circular cone, a triangular pyramid, or so on.

Also, as shown in FIG. 3, the connecting portion 340 has a connecting hole 341 where the string 400 penetrates. One end of the string 400 penetrates through the connecting hole 341, and the one end of the string 400 is coupled to a part of the string 400, thereby connecting the string 400 to the connecting portion 340. Besides, in a case that the connecting portion 340 does not have the connecting hole 341, the string 400 may surround an outer circumferential surface of the connecting portion 340 and one end of the string 400 is coupled to a part of the string 400, thereby connecting the string 400 to the connecting portion 340. Also, one end of the string 400 may be connected to the connecting portion 340 without surrounding the outer circumferential surface of the connecting portion 340.

Next, effects of the camera lens storage and exchange device 10 including the rotation member 300 will be described.

Figure 4:
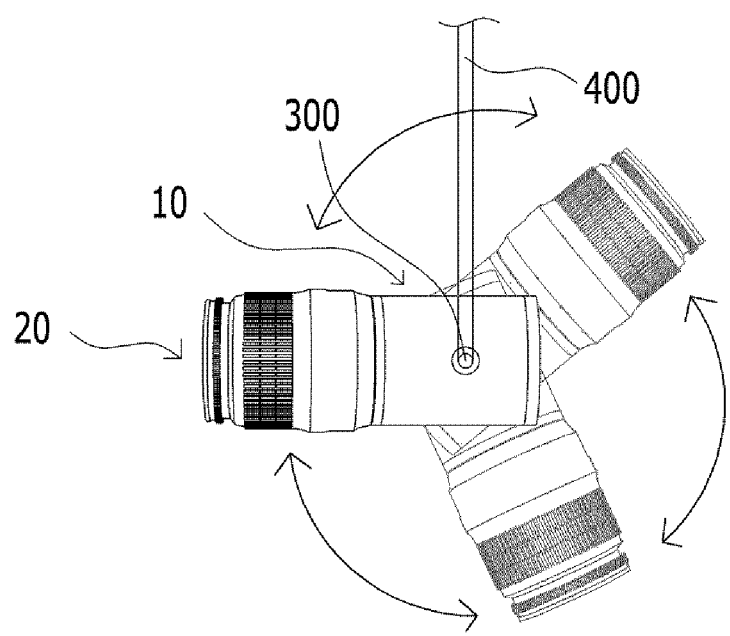
FIG. 4 illustrates a state of the camera lens storage and exchange device rotated by the rotation member shown in FIG. 3.

FIG. 4 illustrates a state of the camera lens storage and exchange device rotated by the rotation member shown in FIG. 3. As shown in FIG. 4, the camera lens storage and exchange device 10 according to the embodiment of the invention can rotate 360 degrees about an axis of the hinge 310 by the rotation member 300.

For example, in order to couple the camera lens 20 to one coupling mount 200 of the pair of coupling mounts 200 of the camera lens storage and exchange device 10, a user grasp the body 100 by a hand and rotates the camera lens storage and exchange device 10 by a degree so that the one coupling mount 200 of the pair of coupling mounts 200 can be seen by the user. Then, the lens mount 21 of the camera lens 20 is coupled to the coupling mount 200. In this instance, the camera lens 20 coupled to the coupling mount 200 rotates to the ground about an axis of the hinge 310 by the rotation member 300 due to self-load (tare weight) of the camera lens 20 although the user does not manually rotate.

As another example, in order to exchange the camera lens 20 coupled to one coupling mount 200 of the pair of coupling mounts 200 of the camera lens storage and exchange device 10 with another camera lens 20, the camera lens 20 coupled to the camera lens storage and exchange device 10 heads for the ground due to self-load, and another coupling mount 200 where the camera lens 20 is not coupled is positioned at a side opposite to the ground. Therefore, the user separates the another camera lens 20 coupled to the camera, and couples the another camera lens 20 separated from the camera to the another coupling mount 200 where the camera lens 20 is not coupled. And then, the user separates the camera lens 20 coupled to the one coupling mount 200 from the one coupling mount 2 0 0, and mounts the camera lens 20 to the camera. In this instance, the another camera lens 20 separated from the camera and coupled to the camera lens storage and exchange device 10 rotates to the ground about an axis of the hinge 310 by the rotation member 3 0 0 due to self-load of the camera lens 20 although the user does not manually rotate. Because the camera lens 20 heads to the ground, the camera lens 20 can be safely carried and can be conveniently carried even when the user moves.

As in the above, according to the camera lens storage and exchange device 10, the user can conveniently exchange the camera lenses 20 by the rotation member 300.

Although the camera lens storage and exchange device of the embodiment of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A device, comprising:
    a body;
    a pair of camera lens coupling mounts provided at opposite ends of the body, each of the pair of camera lens coupling mounts configured to be coupled to a corresponding lens mount of a camera lens; and
    at least one attachment member provided on an outer surface of the body, the at least one attachment member configured to allow the body to rotate about an axis defined by the at least one attachment member.

2. The device according to claim 1, wherein the at least one attachment member being configured to be attached to a carrying device.

3. The device according to claim 2, wherein each of the pair of camera lens coupling mounts includes at least one fixing member disposed on a surface within an inner circumference of each of the pair of camera lens coupling mounts, the at least one fixing member capable of retaining the lens mount of the camera lens within either of the pair of camera lens coupling mounts when the lens mount of the camera lens is coupled to either of the pair of camera lens coupling mounts.

4. The device according to claim 3, wherein the body further comprises at least one button configured to separate an end portion of the lens mount of the camera lens from the at least one fixing member when the at least one button is pushed by a user.

5. The device according to claim 4, wherein the body further comprises a second button configured to reduce frictional contact between an end portion of another lens mount of the camera lens and the at least one fixing member when the second button is pressed by a user.

6. The according to claim 3, wherein the at least one fixing member includes a plurality of fixing members configured to retain the lens mount of the camera lens within either of the pair of camera lens coupling mounts when the lens mount of the camera lens is coupled to either of the pair of camera lens coupling mounts.

7. The device according to claim 1, wherein the at least one attachment member comprises:
    a hinge;
    an inner hanging portion provided at an inside of the body, wherein the inner hanging portion being connected to one end of the hinge;
    an outer hanging portion provided at an outside of the body, wherein the outer hanging portion being connected to another end of the hinge; and
    a connecting portion provided at a surface of the outer hanging portion opposite to the hinge, wherein the connecting portion being configured to connect a carrying device thereto.

8. The device according to claim 7, wherein the body comprises a hole in which the hinge is disposed therein.

9. The device according to claim 8, wherein the body is configured to be rotated 360 degrees about an axis of the hinge by the at least one attachment member.

10. The device according to claim 8, wherein the at least one attachment member comprises a second attachment member including a second hinge, and
    wherein the body further comprises a second hole in which the second hinge is disposed therein.

11. The device according to claim 1, wherein the at least one attachment member comprises a pair of attachment members disposed on opposite sides of the body from each other.

12. A device comprising:
    a body having a first end and an oppositely disposed second end, both ends being disposed along a longitudinal axis of the body;
    a camera lens coupling mount disposed at each of the first and second ends, each of the camera lens coupling mounts configured to, with respect to the body, receive thereto, retain therein, and release therefrom, a corresponding lens mount of a camera lens; and
    an attachment member disposed proximate a mid-point of the body, the attachment member configured to allow the body to rotate about a rotational axis defined by the attachment member,
    wherein the longitudinal axis of the body being disposed orthogonal to and intersecting with the rotational axis defined by the attachment member.

13. The device of claim 12, wherein the attachment member further comprises an attachment element configured to be attached to a carrying device.

14. The device of claim 12, wherein each of the camera lens coupling mounts comprises a fixing mechanism being configured to retain the lens mount of the camera lens to each of the camera lens coupling mounts.

15. The device of claim 14, wherein the body includes a releasing actuator that, when pushed by a user, is configured to separate the lens mount of the camera lens from the fixing mechanism, thereby facilitating the release of the lens mount of the camera lens from either of the camera lens coupling mounts.

16. A method comprising:
    providing device including
        a body having a first end and an oppositely disposed second end, both ends being disposed along a longitudinal axis of the body,
        a first camera lens coupling mount disposed at the first end and a second camera lens coupling mount disposed at the second end, wherein the first and second camera lens coupling mounts configured to, with respect to the body, receive thereto, retain therein, and release therefrom, a corresponding lens mount of a camera lens, and
        at least one attachment member disposed proximate a mid-point of the body, the at least one attachment member configured to allow the body to rotate about a rotational axis defined by the at least one attachment member;
    attaching a corresponding lens mount of a first camera lens to one of the first or second ends of the body via a respective camera lens coupling mount;
    rotating the body about the rotational axis of the at least one attachment member so the first camera lens attached to the body rotates toward a downward facing direction;

attaching a corresponding lens mount of a second camera lens to the other of the first or second ends of the body via the respective camera lens coupling mount;

detaching the first camera lens from the body via the respective camera lens coupling mount; and rotating the body about the rotational axis of the at least one attachment member so the second camera lens attached to the body rotates toward the downward facing direction.

17. The method of claim 16, further comprising attaching a carrying device to the at least one attachment member.

18. The method of claim 16, further comprising:

providing the at least one attachment member to include a plurality of attachment members disposed at opposing mid-points of the body; and attaching a carrying device to each of the plurality of attachment members.

19. The method of claim 16, wherein detaching the first camera lens from the body via the respective camera lens coupling mount further comprises actuating a release mechanism that is configured to separate the lens mount of the first camera lens from the respective camera lens coupling mount.

20. The method of claim 16, wherein attaching one of the first camera lens or the second camera lens to the body further comprises engaging a fixing mechanism at the respective camera lens coupling mount to retain one of the first camera lens or the second lens to the respective camera lens coupling mount.

* * * * *